(12) United States Patent
Hesse et al.

(10) Patent No.: US 6,312,655 B1
(45) Date of Patent: Nov. 6, 2001

(54) METHOD FOR THE REMOVAL OF CARBON DIOXIDE FROM A PROCESS GAS

(75) Inventors: Horst Joachim Franz August Hesse, Vanderbijlpark; Mathys Johannes Smit, Secunda; Francois Jacobus du Toit, Sasolburg, all of (ZA)

(73) Assignee: Sasol Technology (Proprietary) Limited, Rosebank (ZA)

( * ) Notice: Subject to any disclaimer, the term of this patent is extended or adjusted under 35 U.S.C. 154(b) by 0 days.

(21) Appl. No.: 09/297,891

(22) PCT Filed: Dec. 12, 1997

(86) PCT No.: PCT/GB97/03431

§ 371 Date: Jul. 13, 1999

§ 102(e) Date: Jul. 13, 1999

(87) PCT Pub. No.: WO98/25688

PCT Pub. Date: Jun. 18, 1998

(30) Foreign Application Priority Data

Dec. 12, 1995 (ZA) .................................... 96/10473

(51) Int. Cl.[7] ................................................. B01D 53/62
(52) U.S. Cl. .................... 423/232; 210/649; 210/650; 210/651; 210/652; 210/653
(58) Field of Search ...................... 423/228, 229, 423/232; 210/644, 648, 649, 650, 651, 652, 653

(56) References Cited

U.S. PATENT DOCUMENTS

| | | | |
|---|---|---|---|
| 2,840,450 | 6/1958 | Giammarco | 23/2 |
| 3,086,838 | 4/1963 | Giammarco | 23/2 |
| 3,144,301 | 8/1964 | Mayland | 23/2 |
| 4,271,132 | * 6/1981 | Eickmeyer | 423/228 |
| 4,399,111 | * 8/1983 | Baur | 423/232 |
| 5,292,407 | * 3/1994 | Roy | 204/101 |
| 5,622,681 | * 4/1997 | Grierson | 423/228 |

FOREIGN PATENT DOCUMENTS

| | | |
|---|---|---|
| 2742483 | 3/1979 | (DE) . |
| 0043525 | 1/1982 | (EP) . |
| 286143 | * 10/1988 | (EP) . |
| 0726229 | 8/1996 | (EP) . |
| 518145 | 3/1955 | (IT) . |
| 587522 | 1/1959 | (IT) . |

OTHER PUBLICATIONS

English translation of IT 518145 dated Mar. 4, 1955.
English translation of IT 587522 dated Jan. 16, 1959.
Perry et al. *Chemical Engineers' Handbook* 5th Ed. McGraw–Hill Book Co, USA ISBN 0–07–04947–89, pp. 17–37 to 17–43 and pp. 17–52 to 17–58, 1973.*
Grant et al. Grant & Hackh's Chemical Dictionary, 5th Ed., McGraw–Hill Book Co., USA ISBN 0–07–024067–1, p. 179, 1987.*

* cited by examiner

Primary Examiner—Steven P. Griffin
Assistant Examiner—Timothy C Vanoy
(74) Attorney, Agent, or Firm—Ladas & Parry

(57) ABSTRACT

The invention relates to the absorption of carbon dioxide from a process gas using a solution of potassium carbonate, potassium bicarbonate, diethanolamine and potassium vanadate, followed by desorption of the carbon dioxide from the solution and recycling the regenerated solution. Organic acid salts of potassium build up in the aqueous solution is diluted with aqueous diluent, and then passed over a semi-permeable membrane such as a nanofiltration membrane, and ultrafiltration membrane or a reverse-osmosis membrane using a pressure drop to remove the organic acid salts of potassium from the side stream.

16 Claims, 1 Drawing Sheet

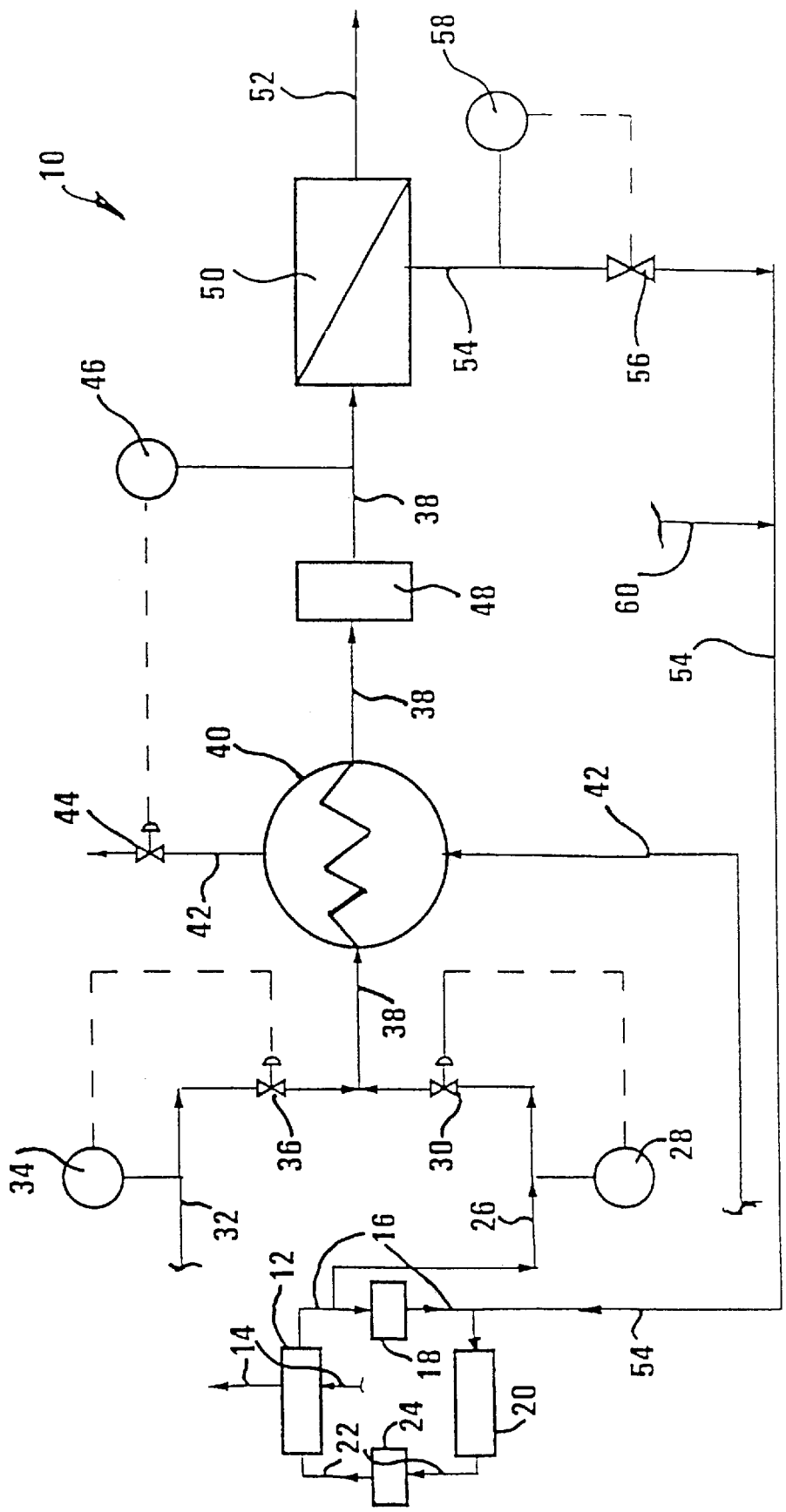

METHOD FOR THE REMOVAL OF CARBON DIOXIDE FROM A PROCESS GAS

SUMMARY OF THE INVENTION

THIS INVENTION relates to a method for the removal of carbon dioxide from a process gas, and to the treatment of an aqueous solution suitable for use in said removal of carbon dioxide. More particularly, the invention relates to a method for the removal of carbon dioxide from a process gas by contacting the process gas with an aqueous solution containing potassium carbonate dissolved therein, and to the treatment of such solution.

According to one aspect of the invention in the continuous removal of carbon dioxide from a process gas by contacting the process gas under pressure in an absorption stage with an aqueous solution containing, dissolved therein, potassium carbonate as a reagent, potassium bicarbonate as a reaction product, diethanol amine as a catalyst and potassium vanadate as a corrosion inhibitor, the carbon dioxide in the process gas being absorbed by the solution and reacting therein with the potassium carbonate reagent according to the reaction:

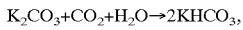
$$K_2CO_3+CO_2+H_2O \rightarrow 2KHCO_3,$$

followed by an increase in the temperature of the solution and a decrease in the pressure exerted thereon to cause desorption, in a desorption stage separate from the absorption stage, of the carbon dioxide from the solution according to the reverse reaction:

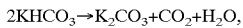
$$2KHCO_3 \rightarrow K_2CO_3+CO_2+H_2O,$$

the aqueous solution continuously being recycled from the desorption stage to the absorption stage for further removal of carbon dioxide from the process gas so that the aqueous solution circulates around a circuit comprising said absorption stage and said desorption stage, the aqueous solution containing organic acids dissolved therein in the form of organic acid salts of potassium and the removal of carbon dioxide from the process gas being associated with a continuous increase in the concentration of said organic acids in the aqueous solution, there is provided the method which comprises the withdrawal, as a side stream, of part of the aqueous solution circulating around the circuit, diluting the side stream with an aqueous diluent, and passing the side stream over a semi-permeable membrane across which there is a pressure drop, to cause an aqueous solution of the organic acid salts of potassium to pass through the membrane, the remainder of the side stream, after it has passed over the membrane, being returned to the circuit, the membrane and the pressure drop across the membrane being selected such that vanadate anions are essentially prevented from passing through the membrane, and such that acceptably small proportions of potassium carbonate, potassium bicarbonate and diethanol amine pass through the membrane, potassium carbonate make-up and diethanol amine make-up being added to the circuit, continuously or intermittently as required, to maintain them in the aqueous solution at the necessary concentrations.

The organic acids may be derived from the process gas. Instead or in addition, they may arise in the circuit.

The semi-permeable membrane may be selected from, but is not limited to, nanofiltration membranes, ultrafiltration membranes and reverse-osmosis membranes.

In the circuit, downstream of the desorption and upstream of the absorption there may be a potassium carbonate concentration of 200–250 g/l, a diethanol amine concentration of 15–20g/l, a potassium vanadate concentration of 16–18 g/l, a concentration of organic acid salts of potassium of up to 160 g/l and a concentration of potassium bicarbonate of 150–250 g/l, although, naturally, these values can vary from one circuit to another, depending on practical and economic considerations.

The absorption may take place at a temperature of 94–107° C. and at a pressure of 2500–3000 kPa, the side stream being withdrawn from the circuit after the absorption and before the pressure decrease which causes the desorption, Diluting the side stream may be such that the side stream, after dilution thereof, has a concentration of organic acid salts of potassium of less than 16 g/l.

The passing of the side stream over the membrane may be at a temperature of 30–60° C. Accordingly, the method may include cooling the side stream, eg after said dilution thereof, to said temperature of 30–60° C. at which it is passed over the membrane. The method may include filtering the side stream before it is passed over the membrane. In this case the method may include cooling the side stream after the diluting of the side stream and before the filtering of the side stream, the cooling being to a temperature of at most 60° C.

More particularly, the side stream may be passed over a said membrane which is a nanofiltration membrane, so that the solution of organic acid salts of potassium is separated from the remainder of the side stream by nanofiltration; and in this case the method may include both cooling the side stream and filtering the side stream before the side stream is passed over the nanofiltration membrane, the cooling of the side stream taking place before the filtering of the side stream and being to a temperature of at most 60° C., and the filtering of the side stream being to remove all particles larger than 5 $\mu$m from the side stream.

According to another aspect of the invention there is provided a method of treating an aqueous solution which contains, dissolved therein, potassium carbonate, potassium bicarbonate, dicthanol amine, potassium vanadate and organic acid salts of potassium, so as to remove said organic salts from the solution while retaining the potassium vanadate in the solution, the method comprising, withdrawing part of the solution from the remainder thereof, diluting said part of the solution with an aqueous diluent and passing the diluted part of the solution over a semi-permeable membrane across which there is a pressure drop, to cause an aqueous solution of the organic acid salts of potassium to pass through the membrane, the rest of said diluted part, after it has passed over the membrane, being returned to the remainder of the solution, the membrane and the pressure drop across the membrane being selected such that the vanadate anions are essentially prevented from passing through the membrane, and such that acceptably small proportions of potassium carbonate, potassium bicarbonate and diethanol amine pass through the membrane.

In this aspect of the invention the diluting of the withdrawn part of the solution may be such that it, after dilution thereof, has a concentration of organic acid salts of potassium of less than 16 g/l; and the passing of the diluted solution over the membrane may be at a temperature of 30–60° C. The method may Include filtering the diluted solution before it is passed over the membrane; and when the filtered solution is at a temperature above 60° C., the method may include cooling the diluted solution after the diluting thereof and before the filtering thereof, being to a temperature of at most 60° C.

The diluted solution may be passed over a said membrane which is a nanofiltration membrane, so that the solution of organic acid salts of potassium is separated from the remainder of the side stream by nanofiltration; and when the diluted solution is at a temperature above 60° C., the method may include both cooling the diluted solution and filtering it before it is passed over the nanofiltration membrane, the cooling of the solution taking place before the filtering of the side stream and being to a temperature of at most 60° C., and the filtering of the side stream being to remove all particles larger than 5 μm from the side stream.

The methods of the invention are expected to find particular application in the treatment of Benfield solutions or any other process solutions containing potassium carbonate, potassium bicarbonate, diethanol amine and potassium vanadate and, as impurities, organic acids salts of potassium, of the type used for removing carbon dioxide from process gas streams. Typically, the aqueous solution treated is thus in the form of a side stream from a carbon dioxide-scrubbing circuit which employs a said potassium carbonate solution. The solution will contain vanadium in the form of dissolved potassium vanadate, and diethanol amine as indicated above.

The semi-permeable membrane may also resist passage of inorganic substances eg chloride anions, therethrough, if they are present in the solution.

As far as the operation of the absorption/desorption circuit is concerned, this will be essentially conventional, a plurality of such circuits being known in the art, each with its own process parameters, as far as flow rates, temperatures and pressures are concerned, the principles of operating such circuits, eg using Benfield solutions, being well known. Accordingly, while the carbon dioxide absorption method of the present invention naturally makes use of relatively high pressure and relatively low temperatures for absorption, and makes use of relatively low pressure and high temperatures for desorption, the exact values are not critical, being essentially conventional and being dictated by economic and practical considerations at the site where the carbon dioxide removal from the process gas is to take place. The present invention is thus in principle applicable to any such carbon dioxide removal method regardless, within limits, of its process parameters.

Similarly, it is contemplated that substantially conventional membrane separation technology will be employed, the exact membrane to be used, the flow rates and the pressure drops being selected in accordance with practical and economic considerations, bearing in mind the intended result, ie the removal of organic acid salts of potassium from the solution being passed over the membrane, without any loss of vanadate ions through the membrane, while keeping potassium carbonate/bicarbonate losses, and diethanol amine losses, together with dilution water usage, at acceptably low levels. Routine experimentation will be employed to select acceptable or optimum values for solution temperatures and pressure drops across the membrane, for concentrations of dissolved species, and for flow rates.

Operating parameters will accordingly be selected with two primary considerations in mind, the first being that there is a continuous increase in the concentration of organic acid salts of potassium in the circuit, derived from acids in the process gas and/or arising in the circuit, such salts acting to deactivate the solution and reduce its absorptive power with regard to carbon dioxide so that their level must be kept as low as practicable, bearing in mind practical and economic considerations, the other primary consideration being that loss of vanadate anions through the membrane must as far as possible be avoided, bearing in mind that they are poisonous and constitute an environmental hazard. Dumping of spent solution, whose content of organic acid salts of potassium is too high, must accordingly, at all costs, be avoided, because of the threat to the environment constituted by the vanadate anions, although the organic acid salts of potassium, eg in a suitably dilute aqueous solution, are not environmentally unacceptable.

Accordingly, by essentially prevented from passing through the membrane, with regard to the vanadate anions, means that their concentration in the organic acid solution which has passed through the membrane must be at most 10 mg/l, preferably being less than 3 mg/l. Acceptably small proportions of potassium carbonate, potassium bicarbonate and diethanol amine, passing through the membrane in turn means that the organic acid solution which has passed through the membrane must contain respectively at most 0.5 g/l potassium carbonate, at most 0.5 g/l potassium bicarbonate and at most 0.5 g/l diethanol amine, preferably respectively at most 0.1 g/l, at most 0.1 g/l and at most 0.1 g/l. By the necessary concentrations, with regard to the potassium carbonate, potassium bicarbonate and diethanol amine, and also the potassium vanadate, are meant the intended or design concentrations for the particular version of the carbon dioxide absorption process being practiced, and from whose circuit the side stream is withdrawn.

Typically, an acceptable concentration of organic acid salts of potassium in the aqueous solution in the circuit is at most 10 g/l, expressed as so-called bonded $K_2CO_3$. All concentrations given in this specification are on a mass basis, unless otherwise stipulated. Examples of organic acid salts of potassium which need to be removed are potassium formate and potassium acetate.

The total concentration of the carbonate ions and the bicarbonate ions in the aqueous solution may be at about 400 g/l, but this value can in practice vary, within limits.

The aqueous diluent is conveniently a process condensate, for example (but not restricted to) a process condensate originating from a CO-shift converter or a CO-shift process unit. After dilution with the aqueous medium, the total concentration of the carbonate ions and the bicarbonate ions present in the aqueous solution of the side stream may be at most 40 g/l, preferably at most 30 g/l, and most preferably at most 20 g/l. The Applicant has successfully tested separation of organic acid salts of potassium by nanofiltration on diluted Benfield solution containing 16–20 g/l $K_2CO_3$ and 19–20 g/l $KHCO_3$ at 40–60° C. with a pressure drop of 26 bar across the membrane.

Preferably, the concentration of organic acid salts of potassium in the treated solution which has passed over the membrane is at most 0.05% by mass, more preferably at most 0.01% by mass, and most preferably these salts are substantially absent.

The aqueous solution may be passed over the semi-permeable membrane with a pressure drop across the membrane of about 1000–3500 kPa. Preferably, this pressure drop is about 1500–3000 kPa, and most preferably about 2000–2600 kPa, eg 2300 kPa.

The aqueous solution may be passed over the semi-permeable membrane at a temperature preferably of 20–60°C., more preferably about 30–50° C., and most preferably about 35–45° C., eg 40° C. However, it is to be appreciated that the aqueous solution temperature may be dictated by the kind of semi-permeable membrane used.

The semi-permeable membrane may have an average pore diameter of about 0.0001–1.0 μm. Preferably, the average pore diameter is about 0.0001–0.1 μm, and most preferably the average pore diameter is about 0.0001–0.001 μm. Typically, the semi-permeable membrane is a nanofiltration membrane which has a molecular mass cut-off of 300

Dalton. Preferably, the semi-permeable membrane is an anisotropic membrane. Examples of suitable anisotropic semi-permeable membranes are NF 45 available in South Africa from the South African agents for Film-Tec (Dow) and DK available in South Africa from the South African agents for Desalination Systems.

The filtration step will act to remove suspended solid particles from the aqueous solution which can interfere with the membrane, prior to passing the aqueous solution over the membrane. Preferably, substantially all suspended particles larger than about 5 μm are removed from the aqueous solution during the filtration step. More preferably substantially all suspended particles larger than about 3 μm, and most preferably all suspended particles larger than 2 μm, are removed during the filtration step. The filtration step may be accomplished by any suitable method known to those skilled in the art.

BRIEF DESCRIPTION OF THE FIGURE

FIG. 1 is a schematic block flow diagram on an installation for carrying out the invention.

DETAILED DESCRIPTION OF THE INVENTION

The invention will now be described, by way of a non-limiting illustration, with reference to the following example and with reference to the diagrammatic drawing.

EXAMPLE

Referring to the drawing, reference numeral 10 generally indicates a block flow diagram of an installation for carrying out the method of the invention using an aqueous Benfield solution which has, dissolved therein, potassium carbonate reagent, potassium bicarbonate reaction product, diethanol amine catalyst and potassium vanadate corrosion inhibitor. The Benfield solution also has, dissolved therein, organic acid salts of potassium (examples of which are potassium formate and potassium acetate) as impurities.

The installation 10 comprises an absorber-desorber circuit for removing carbon dioxide from a process gas stream, the absorber-desorber circuit comprising an absorption stage 12, comprising carbon dioxide scrubbing units and acting on a process gas flow line 14. A flow line 16, containing a pressure reduction and heating stage 18 comprising an expansion turbine, leads to a desorption stage 20, separate from the absorption stage 12. A flow line 22, containing a compression stage 24, leads from the desorption stage 20 to the absorption stage 12.

A side stream Benfield solution line 26 provided with a flow controller 28 and flow control valve 30 leads from the inlet end of the expansion turbine of the pressure reduction and heating stage 18. The line 26 is joined by a process condensate feed line 32, in turn provided with a flow controller 34 and a flow control valve 36, the feed lines 26 and 32 thus feeding into a diluted Benfield solution flow line 38. The flow line 38 feeds through the tube side of a shell-and-tube heat exchanger 40 into the shell side of which feeds a cooling water flow line 42, which is in turn provided with a flow control valve 44 operated by a temperature controller 46 responsive to temperature in the flow line 38 downstream of a filter 48 provided in the line 38.

Downstream of the filter 48, the flow line 38 leads to a nanofiltration module 50. The nanofiltration module 50 employs an NF 45 nanofiltration membrane supplied by Film-Tec (Dow). The nanofiltration module 50 has a permeate outlet flow line 52 and a treated Benfield solution outlet flow line 54, the flow line 54 being provided with a pressure control valve 56 and a pressure controller 58. Finally, a make-up feed line 60 is shown feeding into line 54, downstream of the valve 56, line 54 in turn feeding into line 16 between the pressure reduction and heating stage 18 and the desorption stage 20.

In accordance with the method of the present invention Benfield solution is circulated around the absorber-desorber circuit comprising the absorption stage 12, the pressure reduction and heating stage 18, the desorption stage 20, the compression stage 24, and the flow lines 16 and 22. In conventional and known fashion carbon dioxide is removed from a process gas stream containing carbon dioxide and flowing along flow line 14, at a relatively high pressure of 2600 kPa and at a relatively low temperature of 107° C., in accordance with the reaction $K_2CO_3 + CO_2 + H_2O \rightarrow 2KHCO_3$.

The Benfield solution, containing the dissolved $KHCO_3$ is circulated along flow line 16 through the pressure reduction and heating stage 18, and passes through the expansion turbine to have its pressure reduced. In the desorption unit 20, to which the Benfield solution is fed from the unit 18, desorption of carbon dioxide takes place according to the reverse reaction $2KHCO_3 \rightarrow K_2CO_3 + CO_2 + H_2O$, the carbon dioxide being vented to the atmosphere or recovered for use elsewhere. Benfield solution from the unit 20 is recycled along flow line 22 to the unit 12, via the compression stage 24 where its pressure is raised to said relatively high value.

Benfield solution is withdrawn along line 26 from the inlet end of the expansion turbine of the stage 18. The Benfield solution is at a pressure of about 2600 kPa and at a temperature of about 107° C., which are the conditions existing at the expansion turbine inlet. The Benfield solution contains dissolved potassium carbonate and potassium bicarbonate and also dissolved organic acid salts (eg the formate and the acetate) of potassium. In addition, the Benfield solution also contains dissolved potassium vanadate and dissolved diethanol amine. The flow controller 28 and the flow control valve 30 are used to regulate the flow rate of the Benfield solution along the line 26.

The Benfield solution flowing along line 26 is diluted with process condensate from the condensate feed line 32, which is also at a pressure of about 2600 kPa and is at a temperature of about 120° C., to provide a dilute Benfield solution. The flow rate of the process condensate in the flow line 32 is controlled by the flow controller 34 and the flow control valve 36. After dilution, the total concentration of potassium carbonate and potassium bicarbonate in the dilute Benfield solution is less than 40 g/l, the concentration of organic acid salts of potassium being less than about 15 g/l, the values for potassium vanadate and diethanol amine respectively being less than 0.5 g/l and 0.5 g/l.

The dilute Benfield solution is passed along line 38 through the heat exchanger 40 to reduce the temperature of the dilute Benfield solution. Plant cooling water at a temperature of about 23° C. is used as a cooling medium in the heat exchanger 40. The flow rate of the plant cooling water in the line 42 is controlled by the flow control valve 44 located downstream, relative to cooling water flow, from the heat exchanger 40, and by the temperature controller 46 which measures the temperature of the dilute Benfield solution in the flow line 38 downstream from the filter 48, and controls the setting of the valve 44 and hence the cooling water flow rate and the temperature of the cooled Benfield solution.

The dilute Benfield solution, at a reduced temperature of about 40° C. after the heat exchanger 40, is passed through the filter 48 which removes substantially all particles larger than 5 μm from the dilute Benfield solution.

From the filter 48 the dilute Benfield solution is passed to the nanofiltration module 50. The organic acid salts of potassium pass through the membrane of the nanofiltration module 50 together with a quantity of water to produce a permeate comprising an aqueous solution of said organic acid salts of potassium, such as potassium formate and potassium acetate, which permeate is withdrawn along flow line 52. The permeate is discharged to a drain (not shown) for treatment in the usual manner together with other plant effluent, as it is environmentally acceptable and relatively inoffensive.

The treated Benfield solution, now having a reduced concentration of organic acid salts of potassium, is withdrawn from the nanofiltration module 50 along flow line 54. A pressure drop of about 2300 kPa is maintained across the membrane of the nanofiltration module 50 by means of the pressure control valve 56 and the pressure controller 58. The treated Benfield solution is returned to the flow line 16 at the discharge end of the expansion turbine of the unit 18 for reuse in the desorber-absorber circuit, ie to strip carbon dioxide from the process gas stream flowing along line 14. The concentration of the organic acid salts of potassium in the treated Benfield solution is reduced by the process to the extent that these salts are largely absent from said solution, while substantially all of the vanadate ions in the Benfield solution are retained in the treated Benfield solution. To the extent that there is a continuous, but acceptably low, loss of potassium carbonate, potassium bicarbonate and diethanol amine, and of potassium cations associated with the organic acid salts thereof, along line 52, suitable quantities of make-up thereof are added to the Benfield solution along make-up flow line 60 which feeds into line 54, either continuously, or intermittently, as required.

It is an advantage of the method of the invention, as exemplified, that it provides a way of avoiding having to discharge to waste a spent Benfield solution, whose organic acid salt content is too high and which deactivates the solution to the extent that it can no longer effectively be used. Instead, the Benfield solution is regenerated by the removal of said acids therefrom, while substantially all the vanadate ions, which are poisonous and an environmental hazard, are retained in the solution, together with most of the potassium carbonate, potassium bicarbonate and diethanol amine. Furthermore, it is an advantage that the pressure already existing in the carbon dioxide scrubbing units of the absorption stage 12 can be used indirectly to provide a pressure drop across the semi-permeable membrane of the module 50.

What is claimed is:

1. A method of continuously removing carbon dioxide from a process gas which includes the method steps of: contacting the process gas under pressure in an absorption stage with an aqueous solution containing dissolved therein, potassium carbonate as a reagent, potassium bicarbonate as a reaction product, diethanol amine as a catalyst and potassium vanadate as a corrosion inhibitor, the carbon dioxide in the process gas being absorbed by the aqueous solution and reacting therein with the potassium carbonate according to the reaction $K_2CO_3+CO_2+H_2O \rightarrow 2KHCO_3$; increasing the temperature of the aqueous solution and decreasing the pressure thereon to cause desorption, in a desorption stage separate from the absorption stage, of the carbon dioxide from the aqueous solution according to the reaction $2KHCO_3 \rightarrow K_2CO_3+CO_2+H_2O$;

continuously recycling the aqueous solution from the desorption stage to the absorption stage for further removal of carbon dioxide from the process gas, so that the aqueous solution circulates around a circuit comprising said absorption stage and said desorption stage, the aqueous solution containing organic salts of potassium the removal of carbon dioxide from the process gas being, associated with a continuous increase in concentration of said organic salts in the aqueous solution; withdrawing, as a side stream, part of the aqueous solution circulating around the circuit; diluting the side stream with an aqueous diluent; passing the side stream over a semi-permeable membrane at a pressure differential across the membrane that is in the range of about 1,000 kPascals to 3,500 kPascals to prevent vanadate anions from passing through the semi-permeable membrane while allowing small proportions of potassium carbonate, potassium bicarbonate and diethanol amine to pass through the semi-permeable membrane such that the aqueous solution containing the organic salts of potassium passing through the semi-permeable membrane contains at most 0.5 g/l potassium carbonate, at most 0.5 g/l potassium bicarbonate and at most 0.5 g/l diethanol amine, optionally adding potassium carbonate and diethanol amine to the solution in the circuit; and returning the side stream, after the side stream has passed over the semi-permeable membrane, to the circuit.

2. A method as claimed in claim 1, in which the solution in the circuit downstream of the desorption and upstream of the absorption has a potassium carbonate concentration of 200–250 g/l, a diethanol amine concentration of 15–20 g/l, a potassium vanadate concentration of 16–18 g/l, a concentration of organic acid salts of potassium of up to 160 g/l and a concentration of potassium bicarbonate of 150–250 g/l.

3. A method as claimed in claim 1, in which the absorption takes place at a temperature of 94–107° C. and at a pressure of 2500–3000 kPa, the side stream being withdrawn from the circuit after the absorption and before the pressure decrease which causes the desorption.

4. A method as claimed in claim 1, in which the side stream has a concentration of organic acid salts of potassium of less than 16 g/l.

5. A method as claimed in claim 1, in which the passing of the side stream over the membrane is at a temperature of 30–60° C.

6. A method as claimed in claim 5, in which the diluted side stream is at a temperature above 60° C., the method including cooling the side stream after the diluting of the side stream and before the filtering of the side stream, the cooling being to a temperature of at most 60° C.

7. A method as claimed in claim 1, in which includes filtering the side stream before the side stream is passed over the membrane.

8. A method as claimed in claim 1, in which the side stream is passed over said membrane which is a nanofiltration membrane, so that the solution of organic acid salts of potassium is separated from the remainder of the side stream by nanofiltration.

9. A method as claimed in claim 8, in which the side stream withdrawn from the circuit is at a temperature above 60° C., the method including both cooling the side stream and filtering the side stream before the side stream is passed over the nanofiltration membrane, the cooling of the side stream taking place before the filtering of the side stream and being to a temperature of at most 60° C., and the filtering of the side stream being to remove all particles larger than 5 μm from the side stream.

10. A method of treating an aqueous solution which contains dissolved potassium carbonate, potassium bicarbonate, diethanol amine, potassium vanadate and organic salts of potassium, so as to remove said organic salts of potassium from the aqueous solution while retaining the potassium vanadate in the aqueous solution, the method comprising the method steps of: withdrawing part of the aqueous solution from the remaining aqueous solution; diluting the withdrawn part of the aqueous solution with an aqueous diluent; passing the withdrawn part of the solution of the aqueous solution over a semi-permeable membrane at a pressure differential across the membrane that is in the range of about 1,000 kPascals to 3,500 kPascals to prevent vanadate anions from passing through the semi-permeable membrane while allowing small proportions of potassium carbonate, potassium bicarbonate and diethanol amine to pass through the semi-permeable membrane such that the aqueous solution containing the organic salts of potassium passing through the semi-permeable membrane contains at most 0.5 g/l potassium carbonate, at most 0.5 g/l potassium bicarbonate and at most 0.5 g/l diethanol amine; optionally adding potassium carbonate and diethanol amine to the solution in the circuit, and after the withdrawn part has passed over the semi-permeable membrane, returning the withdrawn part to the remaining aqueous solution.

11. A method as claimed in claim 10, in which the withdrawn part of the solution has a concentration of organic acid salts of potassium of less than 16 g/l.

12. A method as claimed in claim 10, in which the passing of the diluted part of the solution over the membrane is at a temperature of 30–60° C.

13. A method as claimed in claim 10, in which includes filtering the diluted part of the solution before it is passed over the membrane.

14. A method as claimed in claim 13, in which the diluted part of the solution is at a temperature above 60° C., the method including cooling the diluted part of the solution after the diluting thereof and before the filtering thereof, the cooling being to a temperature of at most 60° C.

15. A method as claimed in claim 10, in which the diluted part of the solution is passed over said membrane which is a nanofiltration membrane, so that the solution of organic acid salts of potassium is separated from the rest of the diluted part of the solution by nanofiltration.

16. A method as claimed in claim 15, in which the diluted part of the solution is at a temperature above 60° C., the method including both cooling the diluted part of the solution and filtering it before it is passed over the nanofiltration membrane, the cooling of the solution taking place before the filtering thereof and being to a temperature of at most 60° C., and the filtering thereof being to remove all particles larger than 5 μm therefrom.

* * * * *